United States Patent
Beeler et al.

(10) Patent No.: US 8,559,468 B2
(45) Date of Patent: Oct. 15, 2013

(54) COMBINING A GPS CARRIER WITH EXISTING COMMUNICATION CARRIERS OVER A COMMON COAXIAL CONNECTION

(75) Inventors: Michael Beeler, Jefferson, MD (US); Cris Mamaril, Mesa, AZ (US); Jeffery Harig, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 316 days.

(21) Appl. No.: 13/111,883

(22) Filed: May 19, 2011

(65) Prior Publication Data

US 2011/0228817 A1 Sep. 22, 2011

Related U.S. Application Data

(60) Provisional application No. 61/390,576, filed on Oct. 6, 2010.

(51) Int. Cl.
*H04J 3/04* (2006.01)

(52) U.S. Cl.
USPC .................. 370/532; 455/552.1; 455/12.1

(58) Field of Classification Search
USPC .............. 370/532, 535, 536, 537; 455/552.2, 455/562.1, 12.1, 15, 21, 17, 552.1
See application file for complete search history.

(56) References Cited

U.S. PATENT DOCUMENTS 6,298,243 B1* 10/2001 Basile ...................... 455/552.1
2003/0201939 A1* 10/2003 Reece et al. ............ 343/700 MS

* cited by examiner

*Primary Examiner* — Dady Chery
(74) *Attorney, Agent, or Firm* — Booth Udall Fuller, PLC

(57) ABSTRACT

A method of combining a GPS carrier signal and a communication carrier signal over a common coaxial connection, the method comprising receiving a GPS carrier signal into a signal system using an antenna, which system is configured to receive a non-GPS communication carrier signal from a communication system, processing the GPS carrier signal with the signal communication system to produce a modified GPS carrier signal, the processing comprising at least: filtering the modified GPS carrier signal using a filter, and amplifying the GPS carrier signal using an amplifier; filtering, using a filter, and power combining using a power combiner, the GPS carrier signal and the non-GPS communication carrier signal, and transmitting, using a single coaxial cable, the combined GPS carrier and non-GPS communication carrier signals to a communication device.

32 Claims, 7 Drawing Sheets

COMBINING A GPS CARRIER WITH EXISTING COMMUNICATION CARRIERS OVER A COMMON COAXIAL CONNECTION

CROSS REFERENCE TO RELATED APPLICATIONS

This document claims the benefit of the filing date of U.S. Provisional Patent Application No. 61/390,576, entitled "Combining a GPS Carrier with Existing Communication Carriers over a Common Coaxial Connection" to Michael Beeler, et al., which was filed on Oct. 6, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of the Global Positioning System (GPS), the benefits provided by GPS are in use by communications and positioning systems to provide extremely accurate timing and positioning information throughout the world. The GPS, GLONASS, and soon to be launched Galileo system, utilize multiple center frequencies for operation. The most common frequency is known as L1 and operates at a center frequency of 1,575.42 MHz. The L1 frequency used by GPS supports two modes of operation: Coarse/Acquisition (C/A) using Binary-Phase Shift Keying (BPSK) over an occupied bandwidth of 1.023 MHz, and precision (P) code in Quadrature Phase Shift Keying (QPSK) over an occupied bandwidth of 10.23 MHz. A second center frequency known as L2 and operates at 1,227.60 MHz and utilizes the P code. Additional codes know as L3 (operating at 1,381.05 MHz), L4 (operating at 1,379.913 MHz) and L5 (operating at 1,176.45 MHz) are being considered or under study for future use.

Communications devices use coaxial connections between the indoor and outdoor electronics for operation at frequencies from 950 MHz to over 2,150 MHz. This well known frequency is known in the art as the Intermediate Frequency (IF). In many cases, the passband of the electronic devices is not at the same frequency as the GPS carrier signal. Since many communications devices may not require L2-L5 GPS frequencies, the L1 frequency, operating at 1,575.42 MHz, is the most prolific frequency used for operation. Thus, a need exists for the ability to combine an unaltered GPS carrier signal with existing communication carrier signals flowing between the outdoor and indoor communications devices.

SUMMARY

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

According to a first aspect, a method of combining a GPS carrier signal and a non-GPS communication carrier signal over a common coaxial connection may comprise receiving a GPS carrier signal into a signal system using an antenna, which system is configured to receive a non-GPS communication carrier signal from a communication system, processing the GPS carrier signal with the communication system to produce a modified GPS carrier signal, the processing comprising at least: filtering the modified GPS carrier signal using a filter, and amplifying the GPS carrier signal using an amplifier, the method may further comprise filtering, using a filter, and power combining using a power combiner, the GPS carrier signal and the non-GPS communication carrier signal, and transmitting, using a single coaxial cable, the combined GPS carrier and non-GPS communication carrier signals to a receiving device.

Particular implementations may comprise one or more of the following additional features. If the GPS carrier signal is within a passband of the non-GPS communication carrier signal, the method may further comprise processing the GPS carrier signal comprises moving a frequency of the GPS carrier signal from the passband to a frequency that is outside the passband of the non-GPS communication carrier signal and at least one other carrier signal previously transmitted or received on the single coaxial cable. The filtering, amplifying and power combining may occur within an outdoor electronics device. The antenna may be an active antenna. The antenna may be a passive antenna. The filtering and power combining may occur external to a communications device and inline with an existing coaxial cable. The method may further comprise limiting an input frequency spectrum using a filter. The method may further comprise increasing a power level of the received GPS carrier signal using an amplifier. The method may further comprise preventing the GPS carrier signal from interfering with native operating frequencies on the coaxial cable by moving the frequency of the received GPS carrier signal using a mixer and a local oscillator. The method may further comprise removing an undesired mixing product from the frequency altered GPS carrier signal using a filter.

According to a second aspect, a method of receiving a non-GPS communication carrier signal that has been multiplexed with a GPS carrier signal over a coaxial cable may comprise transmitting or receiving, by a communication device and through a single coaxial cable, a combined communication signal comprising a GPS carrier signal and a non-GPS communication carrier signal, power splitting, using a power splitter, the combined communication signal resulting in separation of a discrete GPS carrier signal component and a discrete non-GPS communication carrier signal component, routing the GPS carrier signal component to a GPS receiving device, and routing the non-GPS communication carrier signal component to an indoor electronics device for demodulation and processing.

Particular implementations may comprise one or more of the following features. The method may further comprise isolating an input spectrum of the combined communication signal to create the discrete GPS carrier signal component and the discrete non-GPS communication carrier signal component using a filter. The frequency of the received GPS carrier signal component may be previously unmodified. The method may further comprise demodulating and processing the GPS carrier signal component by the GPS receiving device. The method may further comprise moving the frequency of the GPS carrier signal component to a new frequency using a mixer and local oscillator. The method may further comprise moving the frequency of the GPS carrier signal component to a frequency that is outside a passband of carrier signals already on the single coaxial cable using a mixer and a local oscillator. The method may further comprise demodulating and processing the GPS carrier signal by the GPS receiving device. The method may further comprise removing an undesired mixing product from the frequency altered GPS carrier signal component.

According to a third aspect, a system for combining a GPS carrier signal and a non-GPS communication carrier signal over a common coaxial connection may comprise an antenna coupled to a receiver of a signal communication system configured to receive a non-GPS communication carrier signal, the communication system further configured to receive a GPS carrier signal, a filter configured to filter the GPS carrier signal, an amplifier configured to improve the GPS carrier signal power, a filter and power combiner configured to power combine the GPS carrier signal and the non-GPS communication carrier signal, and a transmitter configured to transmit the combined GPS carrier and non-GPS communication carrier signals to a communication device through a single coaxial cable.

Particular implementations may comprise one or more of the following features. The system may further comprise a mixer and a local oscillator configured to move a frequency of the GPS carrier signal to a frequency that is outside a passband of carrier signals, including the non-GPS communication carrier signal, already transmitted on the single coaxial cable if the GPS carrier signal is within the passband of the carrier signals already transmitted on the single coaxial cable. The system may further comprise an outdoor electronics device within which the filter is located. The antenna may be an active antenna. The antenna may be a passive antenna. The system may further comprise a device external to the outdoor electronics device within which the filter is located, wherein the device is located inline with an existing coaxial cable. The system may further comprise a filter configured to limit an input frequency spectrum using a filter. The system may further comprise an amplifier that increases a power level of the received GPS carrier signal. The GPS carrier signal may have a frequency that is unmodified when it is power combined with the non-GPS communication carrier signal. The system may further comprise a local oscillator configured to prevent the GPS carrier signal from interfering with native operating frequencies on the coaxial cable by moving the frequency of the received GPS carrier signal. The system may further comprise a filter configured to remove an undesired mixing product from the frequency altered GPS carrier signal.

According to a fourth aspect, a system for transmitting and/or receiving a non-GPS communication carrier signal that has been multiplexed with a GPS carrier signal over a coaxial cable may comprise a communication device configured to communicate a combined communication signal through a single coaxial cable, the combined communications signal comprising a GPS carrier signal component and a non-GPS communication carrier signal component, a power splitter configured to power split the combined communication signal resulting in separation of the GPS carrier signal component and the non-GPS communication carrier signal component, a GPS receiving device configured to receive the separated GPS carrier signal component, and an indoor electronics unit configured to receive, demodulate, and process the separated non-GPS communication carrier signal component.

Particular implementations may comprise one or more of the following features. The system may further comprise a filter configured to isolate an input spectrum of the combined communication signal to create the separated GPS carrier signal component and non-GPS communication carrier signal component. The frequency of the received GPS carrier signal may be previously unmodified. The GPS receiving device may be further configured to demodulating and processing the GPS carrier signal component. The system may further comprise a mixer and a local oscillator configured to move the frequency of the GPS carrier signal component to a new frequency. The system may further comprise a mixer and a local oscillator that are configured to move the frequency of the GPS carrier signal component to a frequency that is outside a passband of carrier signals already on the single coaxial connection. The GPS receiving device may be further configured to demodulate and process the GPS carrier signal component. The mixer may be further configured to remove an undesired mixing product from the frequency altered GPS carrier signal component.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
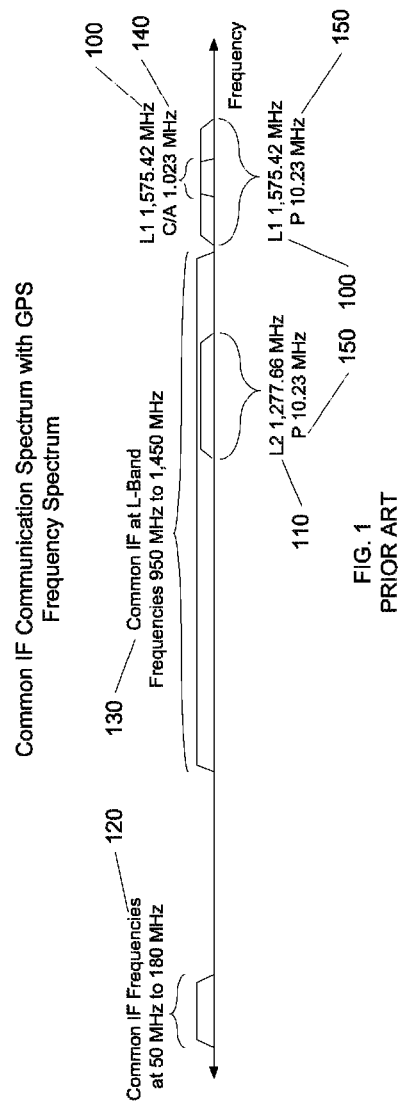
FIG. 1 is a representation of a frequency spectrum for a typical IF coaxial connection with existing communication carriers combined with GPS carriers.

This disclosure, its aspects and implementations, are not limited to the specific components, frequency examples, or methods disclosed herein. Many additional components and assembly procedures known in the art consistent with combining a GPS, GLONASSS or Galileo carrier with existing communication carriers over a common coaxial connection are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a method of combining a Global Positioning System (GPS) carrier signal over a coaxial connection where existing communications are supported between the outdoor and indoor electronics equipment. The term GPS carrier signal may refer to a signal received from any Global Positioning System, for example and not by way of limitation, the GPS system provided by the United States Government, the GLONASS system that is being operated by the Russian Government, or the Galileo system that is being proposed by the European Union.

This disclosure relates to, but is not limited to, combining a GPS carrier signal with an existing non-GPS communication carrier signal(s) over a common coaxial connection. Particular implementations of a method remove the need for a dedicated coaxial connection to support a GPS antenna (active or passive), for a GPS receiver. Particular implementations describe using an existing or new coaxial connection that may be dedicated to carrying existing communication carriers between an outdoor electronics unit (ODU) and indoor electronics unit (IDU) transmit or receiving device. As an alternate embodiment, the GPS carrier signal may be moved from the existing operating frequency to a new frequency that may be above or below the existing center frequency to prevent interference with an existing communication carrier signal of the IF frequency.

The methods described in this disclosure may employ digital signal processing (DSP) techniques such as power combining or splitting, frequency mixing, adaptive filtering or equalization, which can be easily implemented in passive and active power splitters and combiners, frequency mixing circuits, Field-Programmable Gate Array (FPGA), Programmable Logic Device (PLD), Programmable Integrated Circuit (PIC), Digital Signal Processor (DSP), Application Specific Integrated Circuit (ASIC) or microprocessors using conventional implementation methods known in the art with knowledge of this disclosure.

Particular implementations of combining existing communication carrier signals with a GPS carrier signal over a common coaxial connection disclosed herein may be specifically employed in satellite communications systems. However, as will be clear to those of ordinary skill in the art from this disclosure, the principles and aspects disclosed herein may readily be applied to any electromagnetic (such as, but not limited to IF, RF and optical) communications system, such as cellular phone or terrestrial broadcast network without undue experimentation.

The use of the GPS, GLONASS, and the future Galileo system, is prolific and ubiquitous throughout the world for use in personal, commercial, governmental and military systems for providing navigation and timing information. For handheld devices, the GPS antenna is integrated with the receiver device, but for non-hand held devices, especially in configurations where line-of-sight (LOS) access to the GPS satellites (view of the sky) is not possible, a dedicated coaxial connection is required between the indoor located GPS receiver and the outdoor located GPS antenna. For communication devices with an existing or future coaxial connection, the same coaxial connection that may be used for carrying existing communication carrier signals. The same coaxial connection may also be used for carrying the GPS carrier signal through the use of the methods disclosed herein.

Particular implementations may operate with a standard GPS carrier signal(s) at existing frequencies, known in the art as L1 through L5, over an existing coaxial connection, but may be altered by moving the GPS frequencies to new frequencies that may be above or below the existing assigned frequencies to prevent interference with the operation of the existing communications carrier signals operating at IF between the ODU and IDU. FIG. 1 shows the typical frequency spectrum for communication devices that utilize standard, but is not limited to, IF frequencies centered at 50 MHz to 180 MHz 120 and L-Band (950 MHz to 1,450 MHz) 130. IF frequencies may range from DC up to nearly 3 GHz, but beyond 3 GHz, the term IF no longer applies, but instead becomes radio frequency (RF). Carrying these frequencies becomes more difficult due to the increased attenuation losses in the coaxial cable at frequencies higher than 3 GHz. Since the bandwidth on a typical coaxial connection utilizes only a portion of the available frequency spectrum, there is spectrum available for combining additional carriers on to the coaxial connection. FIG. 1 shows the two most common frequency spectrums used for GPS known as L1 100 at 1,575.42 MHz and L2 110 at 1,277.66 MHz. The L1 100 and L2 110 spectrums may further be broken down: the L1 spectrum 100 is comprised of the "C/A" Coarse Acquisition 140 and is provided to support a 1.023 MHz spectrum for use by the public, commercial and non-military. Existing in the same L1 frequency spectrum 100 is the "P" precision 150, and is provided for exclusive use by the military. As can be observed in FIG. 1, the L1 frequency 100 is above IF frequencies shown. The L2 frequency 110, operating at 1,277.66 MHz, uses the precision code 150 and is used exclusively by the military. In nearly any and all communication systems, the L1 code 100 is used for all timing and positioning information. The L3-L5 frequencies are for future and experimental use.

Given the available spectrum on a coaxial connection and the use of occupied spectrum is typically below the L1 frequency in one implementation, the GPS carrier signal may be combined with the existing communication carrier signals on the coaxial connection. In clear sky conditions, the GPS carrier signal exists around −130 dBm, but can be as low as −148 dBm. Therefore the GPS carrier signal is significantly below the noise floor of most communications devices. Since the GPS carrier signal has such low power, combining a GPS carrier signal (L1-L5) has little to no adverse affects on the existing communication carrier signals. Conversely, the processing gain of a GPS carrier signal is not significant enough to overcome the noise contribution of combining the carrier signal with the communication carrier signal when the same spectrum is occupied. For communications devices in the existing art, the GPS jamming signal or noise should be no closer than 80 dB to the GPS carrier signal.

Figure 2:
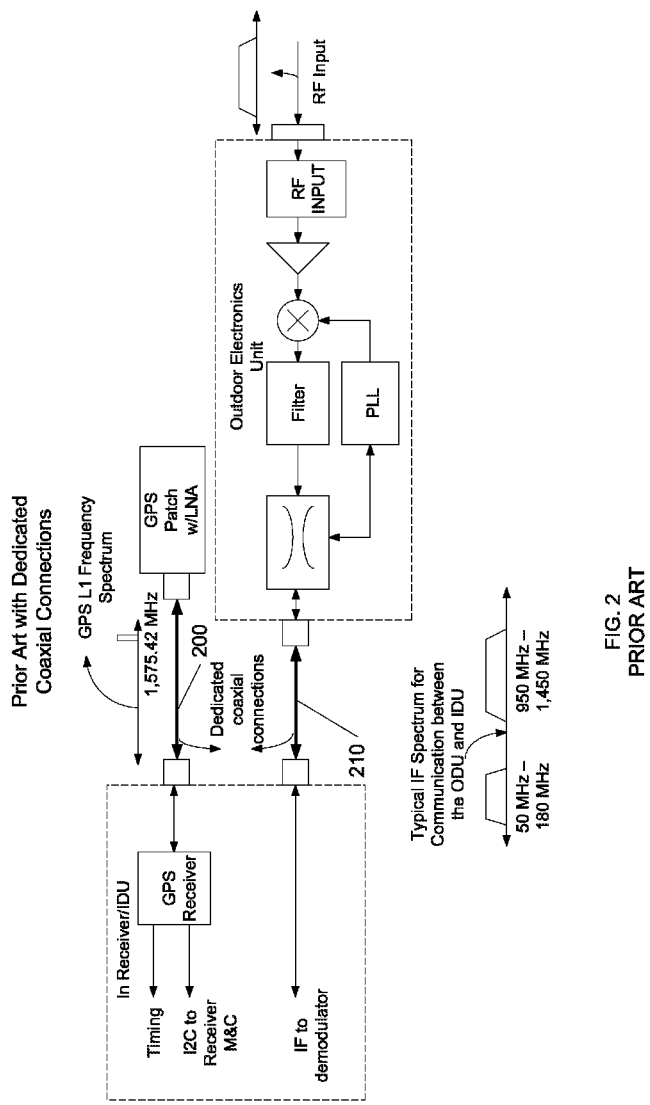
FIG. 2 is a block diagram of a prior art implementation of a GPS antenna connected with a dedicated coaxial connection to a GPS receiving device.

FIG. 2 illustrates the connection of a GPS antenna in the existing art. Multiple coaxial connections may be included to support the connection between indoor electronics unit (IDU) and the outdoor electronics unit (ODU). FIG. 2 also shows a connection for a dedicated coaxial connection 200 for an external GPS antenna and a dedicated coaxial connection 210 for carrying communication carriers between the IDU and ODU.

Figure 3:
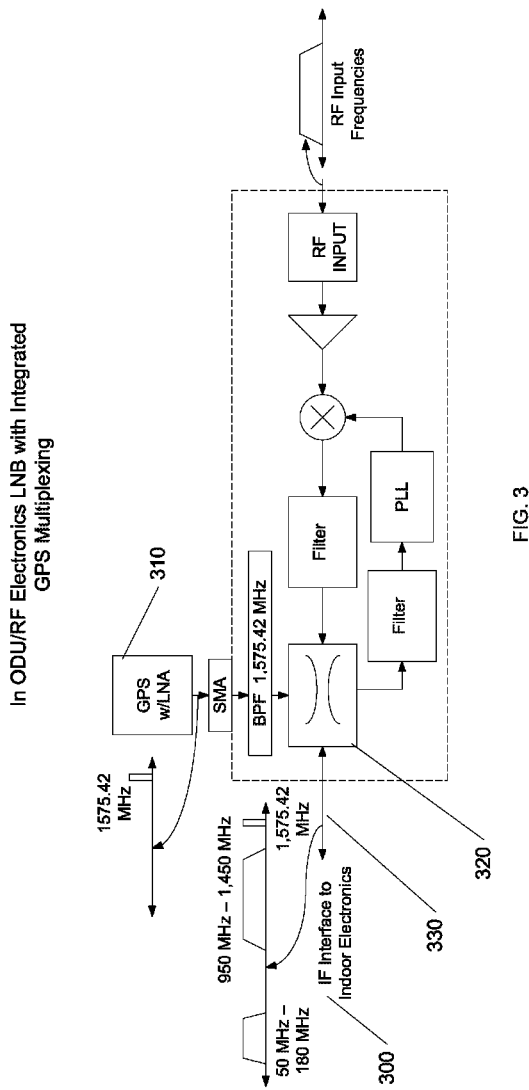
FIG. 3 is a block diagram of an implementation of an integrated combining circuit where existing communication carriers are combined with a GPS carrier.
Figure 4:
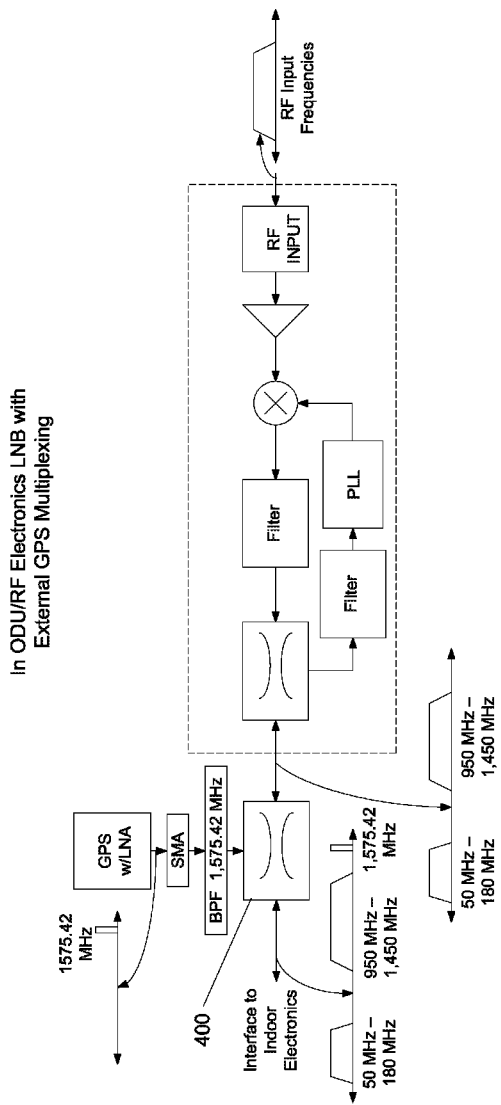
FIG. 4 is a block diagram of an implementation of an external combining circuit where existing communication carriers are combined with a GPS carrier.

FIG. 3 is a block diagram of an ODU device with an integrated GPS combiner and therefore, demonstrates a method for combining the GPS carrier for the interface to an IDU 300. This may be accomplished by combining the output of a GPS antenna that may contain a low-noise amplifier (LNA) 310 via a passive or active power combiner 320 for combining onto the coaxial connection 330 for delivery to the IDU. The noise floor of the outdoor communications device may provide little to no degrading effects to the GPS carrier signal. In an alternate embodiment, the method may be accomplished by externally combining the GPS carrier signal with an external power combining device 400 as shown in FIG. 4. The result is similar, but the embedded method may have additional filtering for optimal performance.

Figure 5:
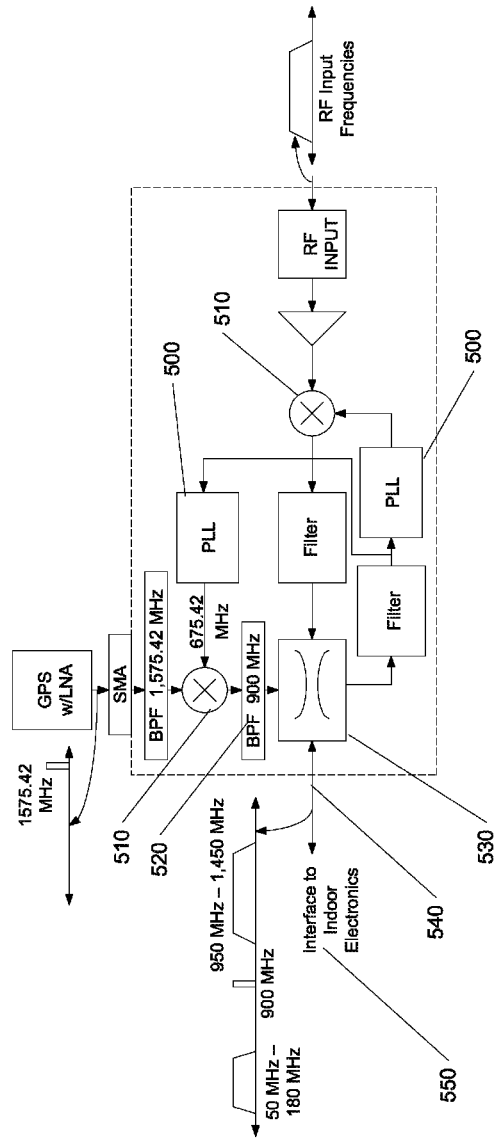
FIG. 5 is a block diagram of an implementation of an integrated combining circuit in which existing communication carriers are combined with a GPS carrier that has been moved in frequency.

In one implementation, if the energy of the existing communication carrier signal is detected in the same spectrum as the desired operation of the GPS L1-L5 frequencies when using the methods disclosed herein, an additional circuit may be added to move the GPS spectrum to a new frequency that is outside the passband of the IF as shown in FIG. 5. The GPS carrier signal may be moved by mixing, or as known in the art as "beating," the carrier with a derived Local Oscillator (LO) 510 reference, resulting in the carrier being moved up or down to a new frequency. A reference may be provided to a Phase-Lock Loop (PLL) 500 where a frequency reference may be created as an LO mixing 510 or beat frequency to enable the GPS carrier signal to be mixed to a new frequency. The GPS carrier signal may be mixed with the derived reference LO 510 in a manner that creates a new upper and lower frequency at (LO+L1) Hz and (LO−L1) Hz, respectively. A bandpass filter 520 may be used to filter reference LO 510 and the unwanted mixing products either (LO+L1) Hz or (LO−L1) Hz. The desired output is then power combined 530 (active or passive) with the communication carrier signals and may be sent to the coaxial connection 540 and to the IDU 550.

Figure 6:
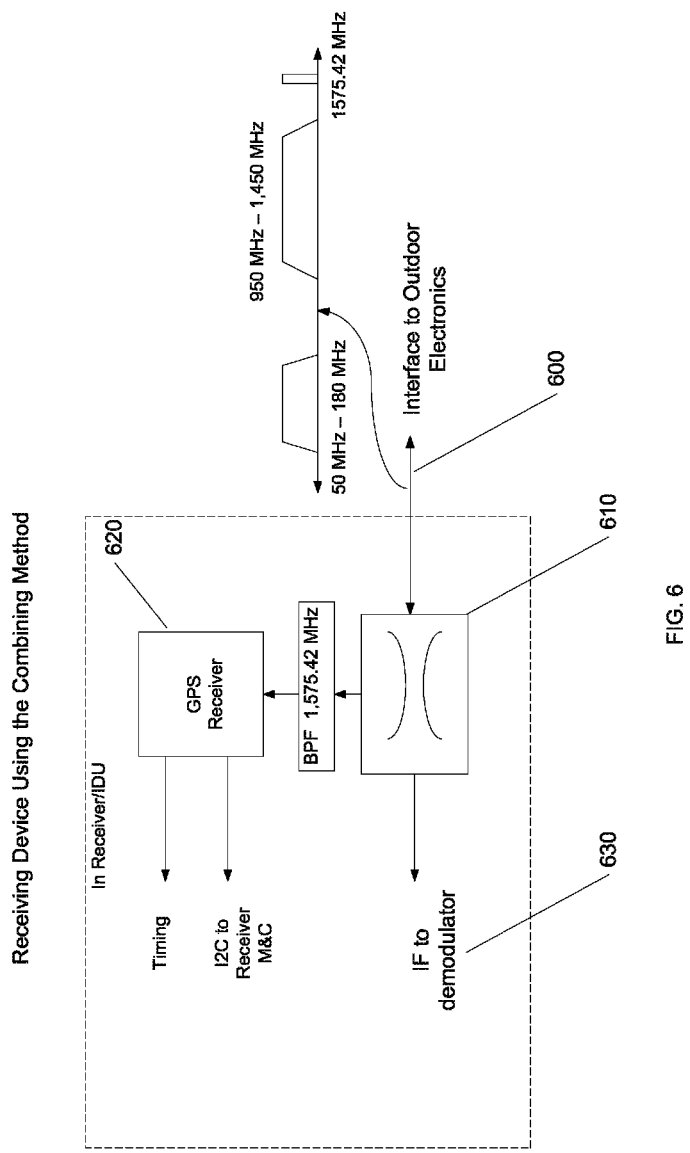
FIG. 6 is a block diagram of an implementation of a splitting circuit in which existing communication carriers are power split for separate processing paths for the existing communication carriers and the GPS carrier.

Once the original communication carrier signal has been combined with a GPS carrier signal, the combined carrier signals may be carried by the coaxial connection 600 to the IDU as shown in FIG. 6, which demonstrates an implementation of a method for separating the combined GPS carrier signal and communication carrier signal(s). The signal input from the coaxial connection may then be power split through the use of an active or passive power splitter 610 and only the GPS carrier signal is delivered to a GPS receiver 620 for reception of the timing and position information for use by the IDU or other connected devices. The existing communication carrier signals are then provided to the IDU demodulation 630 and processing.

Figure 7:
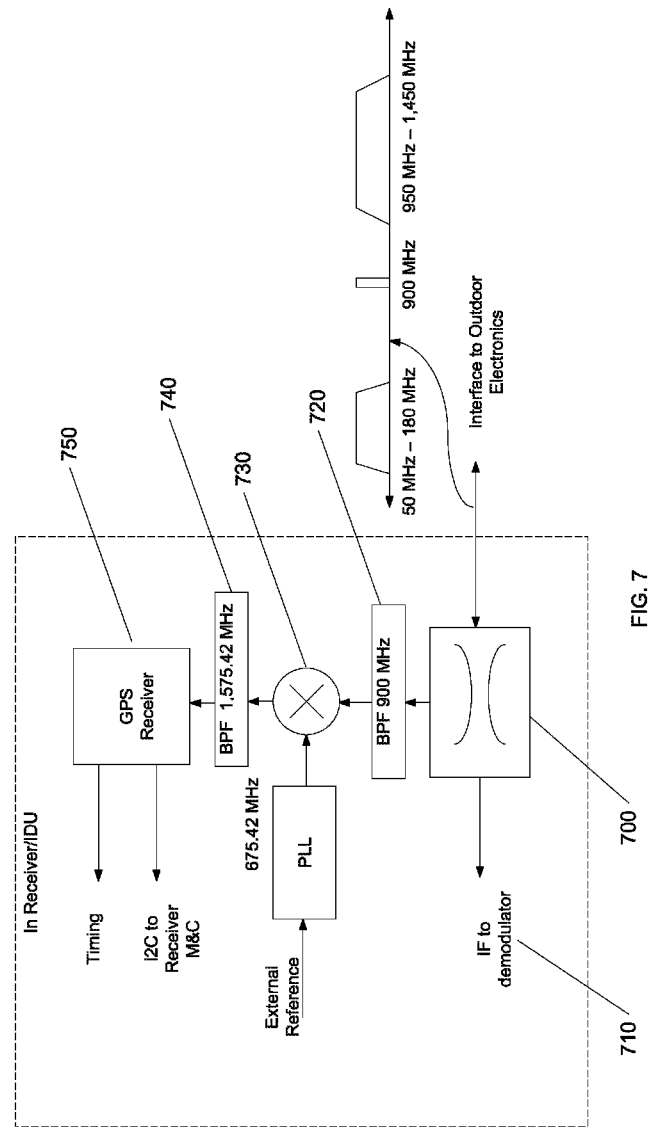
FIG. 7 is a block diagram of an implementation of a splitting circuit where existing communication carriers are power split for processing of the existing communication carriers and the GPS carrier that has been moved in frequency.

FIG. 7 shows an implementation of the methods disclosed herein on the receive side in the situation in which the GPS carrier signal has been moved to a new frequency as shown in FIG. 5. The combined input is power split (passively or actively) 700 and one path provides the existing communication carrier signals to the demodulator in the IDU 710, and another path provides the frequency modified GPS carrier signal to a bandpass filter 720 where the GPS carrier signal may be bandpass filtered to the desired frequency. Once filtered, the carrier signal may be mixed with an LO 730 and the desired mix (high (LO+L1) Hz or low (LO−L1) Hz) is bandpass filtered 740 to provide the native GPS carrier signal such as an 1,575.42 MHz L1 carrier signal to the GPS receiver 750 for processing.

In various applications, once the split signal is provided to the input of the GPS receiver, the GPS carrier signal is processed in the same manner as it would if direct coaxial connection were utilized between a GPS receiver and an external GPS antenna.

The following are non-limiting examples of particular implementations of methods and systems for combining a GPS carrier with existing communication carriers over a common coaxial connection:

Example 1

A satellite LNB is configured to operate using the methods described herein where the satellite signal (existing communication carrier signal) may be received and down converted from Ku-Band (between 10.70 MHz and 12.75 MHz) to L-Band (between 950 MHz and 1,450 MHz). For this example, a GPS L1 frequency (1,575.42 MHz) carrier signal is combined with an existing L-band satellite carrier signal and sent through a coaxial connection to an IDU. The passband supporting the existing communication carrier signal is 950 MHz to 1,450 MHz, and is thus, outside of the passband of the GPS L1 carrier. The resulting combined carrier signals do not appreciably degrade one another, and therefore allow a single coaxial connection to be used to support both the connection to the IDU for the existing communication carrier signal and the GPS carrier signal over a single coaxial connection. At the coaxial input to the IDU, the combined carrier signal is received over the single coaxial connection and power split, the existing communication carrier signal is provided to the IDU for processing, and the GPS signal may be bandpass filtered and provided to the GPS receiver for processing.

Example 2

In particular implementations of the system described in Example 1, the passband of the existing communication carrier signals operates in the same range as the GPS L1 (1,575.42 MHz) carrier signal and the existing communication carrier signals may be received and down converted from C-Band (between 3,700 MHz and 4,200 MHz) to 70/140 MHz IF (between 50 MHz and 180 MHz). For this example, A GPS L1 band (1,575.42 MHz) carrier signal is combined with an existing L-band satellite carrier signal and sent through a coaxial connection to an IDU. The passband supporting the existing communication carrier signals is 50 MHz to 180 MHz, and is thus, outside of the passband of the GPS L1 carrier. The resulting combined carrier signals do not appreciably degrade one another, and therefore allow a single coaxial connection to be used to support both the connection to the IDU for the existing communications carrier signals and the GPS carrier signal over a single coaxial connection. At the coaxial input to the IDU, the combined carrier signal is received over the single coaxial connection, power split, the existing communication carriers are provided to the IDU for processing, and the GPS signal may be bandpass filtered and provided to the GPS receiver for processing.

Example 3

A satellite LNB is configured such that the passband of the existing communication carrier signals operates in the same range as the GPS L1 (1,575.42 MHz) carrier signal. For this example, the existing communication carrier signals operate at 950 MHz to 2,150 MHz, and the L1 GPS carrier signal may be moved from 1,575.42 MHz to 900 MHz by providing an LO frequency for mixing the carrier. When the 1,575.42 MHz is mixed with an LO of 675.42 MHz, the result will be an upper and lower mixing product existing at 2,250.84 MHz (upper) and 900 MHz (lower). Since all frequencies (upper mix, lower mix and LO) are outside of the passband of the exiting communication carrier signals, a bandpass filter may used to filter the undesired frequencies and pass only the desired 900 MHz L1 GPS carrier that has been moved in frequency. At the coaxial input to the IDU combined carrier signals are received over the single coaxial connection, power split, the existing communications carrier signals are provided to the IDU for processing, and the moved GPS carrier signal may be bandpass filtered, mixed with a 675.42 MHz LO, additionally bandpass filtered to extract the 1,575.42 MHz and provided to the GPS receiver for processing.

Example 4

In particular implementations of the system described in Example 3, a satellite LNB is configured where the passband of the existing communication carrier signals operates in the same range as the GPS L1 (1,575.42 MHz) carrier. For this example, the existing communication carrier signals operate at 950 MHz to 2,150 MHz, and the L1 GPS carrier signal may be moved from 1,575.42 MHz to 2,250.84 MHz by providing an LO frequency for mixing the carrier signal. When the 1,575.42 MHz is mixed with an LO of 675.42 MHz, the result will be an upper and lower mixing product existing at 2,250.84 MHz (upper) and 900 MHz (lower). Since all frequencies (upper mix, lower mix and LO) are outside of the passband of the existing communication carrier signals, a bandpass filter may used to filter the undesired frequencies and pass only the desired 2,250.84 MHz L1 GPS carrier signal that has been moved in frequency. At the coaxial input to the IDU combined carrier signals are received over the single coaxial connection, power split, the existing communications carrier signals are provided to the IDU for processing and the moved GPS carrier signal may be bandpass filtered, mixed with a 675.42 MHz LO, bandpass filtered to extract the 1,575.42 MHz and provided to the GPS receiver for processing.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of combining a GPS carrier signal and a non-GPS communication carrier signal over a common coaxial connection, the method comprising:
   receiving a GPS carrier signal into a signal system using an antenna, which system is configured to receive a non-GPS communication carrier signal from a communication system;
   processing the GPS carrier signal with the communication system to produce a modified frequency translated GPS carrier signal, the processing comprising at least:
      preventing the GPS carrier signal from interfering with native operating frequencies on the coaxial cable by moving the frequency of the received GPS carrier signal using a mixer and a local oscillator;
      filtering the modified frequency translated GPS carrier signal using a filter; and
      amplifying the modified frequency translated GPS carrier signal using an amplifier;
   filtering, using a filter, and power combining using a power combiner, the modified frequency translated GPS carrier signal and the non-GPS communication carrier signal; and
   transmitting, using a single coaxial cable, the combined modified frequency translated GPS carrier and non-GPS communication carrier signals to a receiving device.

2. The method of claim 1, wherein if the GPS carrier signal is within a passband of the non-GPS communication carrier signal, processing the GPS carrier signal comprises moving a frequency of the GPS carrier signal from the passband to a frequency that is outside the passband of the non-GPS communication carrier signal and at least one other carrier signal previously transmitted or received on the single coaxial cable.

3. The method of claim 1, wherein the filtering, amplifying and power combining occur within an outdoor electronics device.

4. The method of claim 1, wherein the antenna is an active antenna.

5. The method of claim 1, wherein the antenna is a passive antenna.

6. The method of claim 1, wherein the filtering and power combining occur external to a communications device and inline with an existing coaxial cable.

7. The method of claim 1, further comprising limiting an input frequency spectrum using a filter.

8. The method of claim 1, further comprising increasing a power level of the received GPS carrier signal using an amplifier.

9. The method of claim 1, further comprising removing an undesired mixing product from the modified frequency translated GPS carrier signal using a filter.

10. A method of receiving a non-GPS communication carrier signal that has been multiplexed with a GPS carrier signal over a coaxial cable, the method comprising:
   transmitting or receiving, by a communication device and through a single coaxial cable, a combined communication signal comprising a GPS carrier signal and a non-GPS communication carrier signal;
   power splitting, using a power splitter, the combined communication signal resulting in separation of a discrete GPS carrier signal component and a discrete non-GPS communication carrier signal component;

moving the frequency of the GPS carrier signal component to a new frequency using a mixer and local oscillator;

routing the GPS carrier signal component to a GPS receiving device; and routing the non-GPS communication carrier signal component to an indoor electronics device for demodulation and processing.

11. The method of claim 10, further comprising isolating an input spectrum of the combined communication signal to create the discrete GPS carrier signal component and the discrete non-GPS communication carrier signal component using a filter.

12. The method of claim 10, wherein the frequency of the received GPS carrier signal component is previously unmodified.

13. The method of claim 10, further comprising demodulating and processing the GPS carrier signal component by the GPS receiving device.

14. The method of claim 10, further comprising moving the frequency of the GPS carrier signal component to a frequency that is outside a passband of carrier signals already on the single coaxial cable using a mixer and a local oscillator.

15. The method of claim 14, further comprising demodulating and processing the GPS carrier signal by the GPS receiving device.

16. The method of claim 10, further comprising removing an undesired mixing product from the frequency altered GPS carrier signal component.

17. A system for combining a GPS carrier signal and a non-GPS communication carrier signal over a common coaxial connection, the system comprising:

an antenna coupled to a receiver of a signal communication system configured to receive a non-GPS communication carrier signal, the communication system further configured to receive a GPS carrier signal;

a local oscillator configured to prevent the GPS carrier signal from interfering with native operating frequencies on the coaxial cable by moving the frequency of the received GPS carrier signal;

a filter configured to filter the GPS carrier signal;

an amplifier configured to improve the GPS carrier signal power;

a filter and power combiner configured to power combine the GPS carrier signal and the non-GPS communication carrier signal; and a transmitter configured to transmit the combined GPS carrier and non-GPS communication carrier signals to a communication device through a single coaxial cable.

18. The system of claim 17, further comprising a mixer and a local oscillator configured to move a frequency of the GPS carrier signal to a frequency that is outside a passband of carrier signals, including the non-GPS communication carrier signal, already transmitted on the single coaxial cable if the GPS carrier signal is within the passband of the carrier signals already transmitted on the single coaxial cable.

19. The system of claim 17, further comprising an outdoor electronics device within which the filter is located.

20. The system of claim 17, wherein the antenna is an active antenna.

21. The system of claim 17, wherein the antenna is a passive antenna.

22. The system of claim 17, further comprising a device external to the outdoor electronics device within which the filter is located, wherein the device is located inline with an existing coaxial cable.

23. The system of claim 17, further comprising a filter configured to limit an input frequency spectrum using a filter.

24. The system of claim 17, further comprising an amplifier that increases a power level of the received GPS carrier signal.

25. The system of claim 17, further comprising a filter configured to remove an undesired mixing product from the frequency altered GPS carrier signal.

26. A system for transmitting and/or receiving a non-GPS communication carrier signal that has been multiplexed with a GPS carrier signal over a coaxial cable, the system comprising:

a mixer and a local oscillator configured to move a frequency of a GPS carrier signal component to a new frequency;

a communication device configured to communicate a combined communication signal through a single coaxial cable, the combined communications signal comprising the GPS carrier signal component and a non-GPS communication carrier signal component;

a power splitter configured to power split the combined communication signal resulting in separation of the GPS carrier signal component and the non-GPS communication carrier signal component;

a GPS receiving device configured to receive the separated GPS carrier signal component; and an indoor electronics unit configured to receive, demodulate, and process the separated non-GPS communication carrier signal component.

27. The system of claim 26, further comprising a filter configured to isolate an input spectrum of the combined communication signal to create the separated GPS carrier signal component and non-GPS communication carrier signal component.

28. The system of claim 26, wherein the frequency of the received GPS carrier signal is previously unmodified.

29. The system of claim 26, wherein the GPS receiving device is further configured to demodulating and processing the GPS carrier signal component.

30. The system of claim 26, wherein the mixer and the local oscillator are further configured to move the frequency of the GPS carrier signal component to a frequency that is outside a passband of carrier signals already on the single coaxial connection.

31. The system of claim 26, wherein the GPS receiving device is further configured to demodulate and process the GPS carrier signal component.

32. The system of claim 26, wherein the mixer is further configured to remove an undesired mixing product from the frequency altered GPS carrier signal component.

* * * * *